United States Patent [19]
Kawasumi et al.

[11] Patent Number: 4,757,748
[45] Date of Patent: Jul. 19, 1988

[54] VACUUM BOOSTER FOR AUTOMOBILES

[75] Inventors: Satoshi Kawasumi, Takahama; Michiharu Nishii, Toyota, both of Japan

[73] Assignee: Aisin Seiki Kabushiki Kaisha, Kariya, Japan

[21] Appl. No.: 875,217

[22] Filed: Jun. 17, 1986

[30] Foreign Application Priority Data

Jun. 20, 1985 [JP] Japan .................. 60-93376[U]

[51] Int. Cl.$^4$ ................................. F15B 9/10
[52] U.S. Cl. ...................... 91/369 A; 91/376 R; 92/84
[58] Field of Search ............. 91/369 R, 369 A, 369 B, 91/376 R; 92/84

[56] References Cited

U.S. PATENT DOCUMENTS

| 3,543,298 | 11/1970 | Rockwell | 91/369 A X |
| 4,347,779 | 9/1982 | Belart | 91/369 A |
| 4,437,390 | 3/1984 | Ohta | 91/369 A X |
| 4,494,443 | 1/1985 | Tsubouchi | 91/376 R X |

FOREIGN PATENT DOCUMENTS 0195460  11/1984  Japan ................. 91/369 A

Primary Examiner—Robert E. Garrett
Assistant Examiner—Mark A. Williamson
Attorney, Agent, or Firm—Oblon, Fisher, Spivak, McClelland & Maier

[57] ABSTRACT

A vacuum booster including a push rod, a housing having a first and second compartments, a power piston located in the housing and operated by a pressure differential between the first and second compartments and including a small and large diameter opening portion, a control valve operatively associated with the push rod and located within the power piston for controlling the pressure differential between the first and second compartments in response to movement of the push rod, an output member having a rear end portion slidably disposed within the large diameter opening portion of the power piston, a valve plunger provided in the control valve and having one end slidably disposed in the small diameter opening of the power piston, a resilient reaction disc located adjacent the rear end portion of the output member and disposed within the large diameter portion of the power piston, and an elastic member disposed between the rear end portion of the output member and the power piston and defining a position of the output member for the power piston to form a predetermined gap in an axial direction between the resilient reaction disc and the output member when the vacuum booster is not operated.

5 Claims, 3 Drawing Sheets

1

VACUUM BOOSTER FOR AUTOMOBILES

BACKGROUND OF THE INVENTION

1. Field of the Invention

The invention relates to a vacuum booster for reducing the force required for stepping on the pedal for operating a brake system for automobiles and, more particularly, to a rubber disc type reaction force apparatus for a vacuum brake booster for automobiles.

2. Description of the Prior Art

There have been heretofore developed two types of reaction force appartuses for brake boosters. One such apparatus is of a so called lever type and the other is of a rubber disc type which is shown in U.S. Pat. No. 3,754,450, for example. The latter type is considered simpler in construction and easier to assemble as compared with the former type.

The prior art disclosed in U.S. Pat. No. 3,745,450 discloses a rubber disc type disposed between an output rod and a power piston. In this prior art reference, the output rod is not directly contacted with the power piston of resin and the rear end portion of the output rod is normally contacted with the front surface of the rubber disc. When the brake booster is not operated, there exists a gap between the rear surface of the rubber disc and valve plunger. When the brake booster is operated, the rubber disc is not contacted with the valve plunger when the propulsive force of the output rod transmitted from the power piston through the rubber disc to the output rod reaches a predetermined value. Accordingly, the reaction force in compliance with the fluid pressure which is produced in a brake master cylinder is not added to the force acting on the valve plunger. When the propulsive force transmitted to the output rod reaches the predetermined value, the rubber disc is elastically transformed and protrudes into the small diameter opening portion of the power piston. As a result, the rubber disc will be contacted with the valve plunger and the reaction force will be added to the valve plunger.

In this prior art, however, the propulsive force of the output rod is set so as to be of a large value wherein the reaction force is not added to the valve plunger, and the volume of the rubber disc is elastically transformed and protrudes into the small diameter opening portion of the power piston increases, whereby the transformation of the rubber disc in the border portion between the small diameter opening portion and large diameter opening portion of the power piston become excessive and results in damage to the border portion of the rubber disc in use.

SUMMARY OF THE INVENTION

It is, therefore, a primary object of the present invention to provide a vacuum brake booster including a rubber disc type reaction force apparatus in which the propulsive force of the output rod can be set to be a large value, when the reaction force is not added to the valve plunger, without the volume of the rubber disc being elastically transformed and protruded into the small diameter opening portion of the power piston so as to become excessively large.

According to the present invention, an elastic member is disposed within the opposed portion in an axial direction between the rear end portion of the output rod and the power piston, with the result that the position of the output rod for a power piston is defined so that a gap may be formed in the axial direction between the front surface of rubber disc and output rod when the vacuum booster is not operated. Therefore, the propulsive force of the output rod at a time immediately before the reaction force has begun to be added to the valve plunger depends upon both the elastic force of the elastic member and the elastic force of the rubber disc. For this reason, the propulsive force of the output rod under the condition where the reaction force is not added to the valve plunger become large even though the volume of the rubber disc elastically transformed and protruded into the small diameter opening portion of the power piston is the same as that of the prior art. Consequently, the propulsive force of the output rod under the condition where the reaction force is not added to the valve plunger can be set to be a large value without causing an excessive elastic transformation of the rubber disc, and thus the aforementioned drawbacks of the prior art can be substantially obviated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
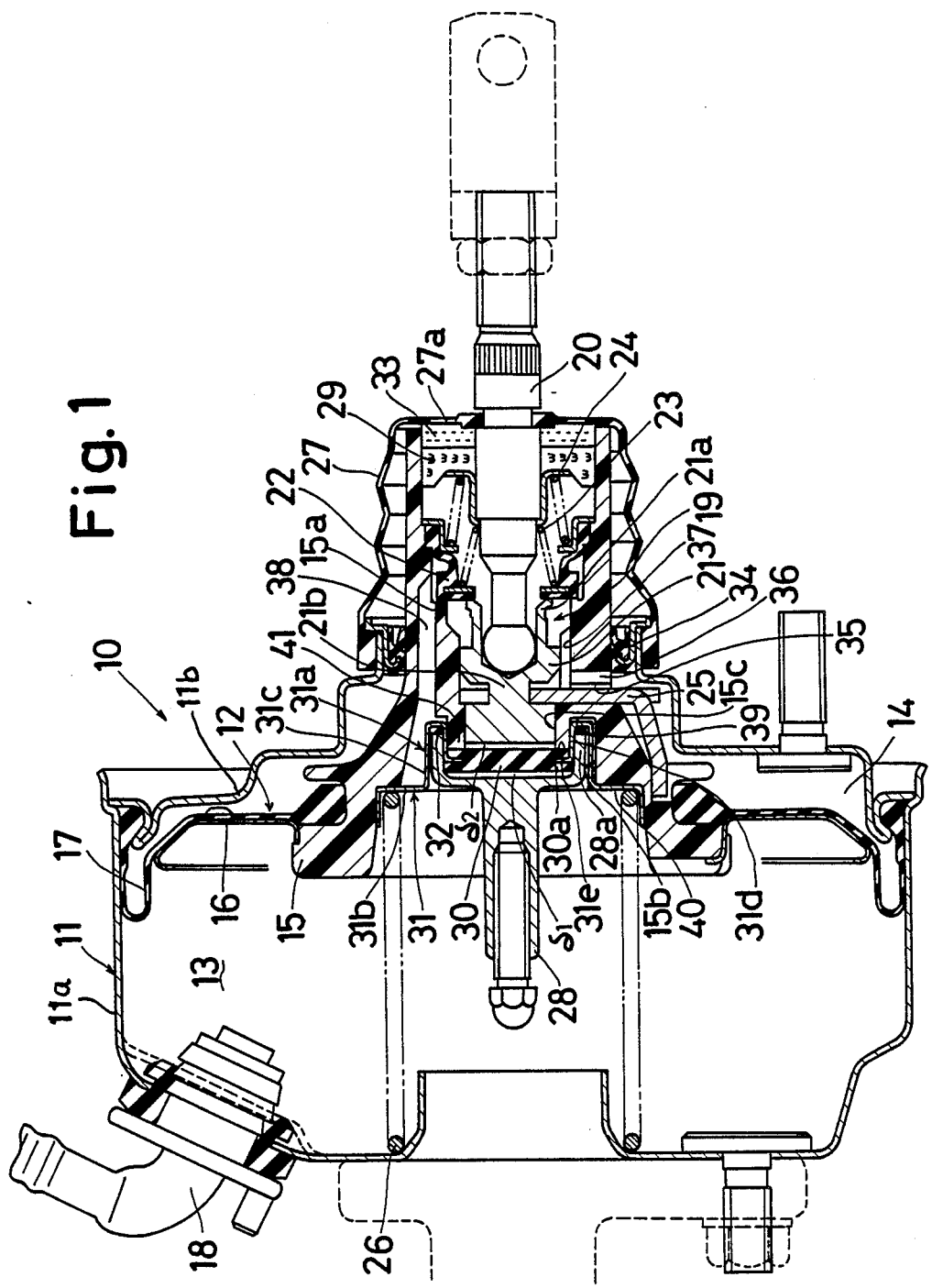
FIG. 1 shows a first embodiment of the present invention in a cross-sectional view.

Referring now to the attached drawings, numeral 10 designates generally a vacuum booster to be used for assisting automobile brakes (not shown). A housing 11 for the booster has two sections 11a and 11b connected with each other by a suitable connecting mechanism (not shown). The housing 11 is divided into two compartments 13 and 14 by a power piston 12 and a diaphragm member 17 made of a rubber material. The power piston 12 has a central hub portion 15 made of a resinous material and a metallic disc portion 16 integrally connected to the hub portion 15. An outer bead portion of the diaphragm 17 is hermetically clamped by the two sections 11a and 11b of the housing 11. The inner bead portion of the diaphragm 17 is air-tightly fixed in the hub portion 15. The front compartment 13 is connected to a vacuum source (for example, in this embodiment, to the intake manifold of an engine) through a check valve 18, and, as a result the front compartment 13 is normally maintained in a vacuum state. The hub portion 15 has a cylindrical portion extending rearwardly (to the right of FIG. 1) and protruding at the right end thereof outwardly from the rear wall of the housing 11.

A seal member 34 is inserted between the rear wall of the housing 11 and the outer surface of the cylindrical portion of the hub portion 15 to air-tightly support the cylindrical portion.

The hub portion 15 has a hollow portion formed in the center thereof within which a conventional control valve mechanism 19 is located in order to control the pressure differential between two compartments 13 and 14. The control valve mechanism 19 comprises a push rod 20, a valve plunger 21, a poppet valve 22 made of rubber material, springs 23, 24 and a key member 25. The push rod 20 is connected to a well-known brake pedal (not shown) and is moved in an axial direction in response to the movement of the brake pedal. The valve plunger 21 is connected with the left end of the push rod 20.

The poppet valve 22 has a front end surface which is able to contact with and be separated from both the seat 21a of the rear end portion of the valve plunger 21 and the seat 15a which is provided on the hub portion 15 so that such is positionable in an outer diameter direction from the seat 21a. On the other hand, the rear end portion of the poppet valve 22 is secured to the inside surface of the cylindrical portion of the hub portion 15. The front end surface of the poppet valve 22 is normally air-tightly contacted with the seat 21a of the rear end portion of the valve plunger 21 by means of a biasing force of the spring 23 biasing the front end surface of the poppet valve 22 toward the left and a biasing force of spring 24 biasing the push rod 20 toward the right. Then the biasing force of the spring 24 is set to be greater than that of the spring 23.

The key member 25 is inserted in an opening portion 35 of the hub portion 15 and is further engaged with the small diameter portion 21b having a slit portion provided in the key member 25. Thus, the rearmost position of the valve plunger 21 is defined by the key member 25. The key member 25 is able to be moved a predetermined distance toward the front and rear in an opening portion 35 and is provided with a pair of arm portions (not shown) extending along an outer circumference of the hub portion 15. When the brake booster 10 is not operated, the power piston 12 is maintained at the rearmost position by the return spring 26 as shown FIG. 1. At this time the arm portions are contacted with the inner surface of the rear wall of housing 11. In this case, the rearmost positioning of the power piston 12 is prevented due to the fact that the front-side surface of an opening portion 35 of the hub portion 15 is contacted with the front-side surface of key member 25.

In operation, when a brake booster 10 is not operated, namely when the brake pedal is not depressed, as shown FIG. 1, the front end surface of the poppet valve 22 is contacted with the seat 21a of the valve plunger 21, and also is separated from the seat 15a of the hub portion 15 by only a small distance. Consequently, the vacuum pressure in the front compartment 13 is supplied to the rear compartment 14 by means of a passage 36 provided in the hub portion 15, a passage 37 provided in the hub portion 15, a clearance between the front end surface of the poppet valve 22 and the seat 15a provided on the hub portion 15, and a passage 38 provided in the hub portion 15. The power piston 12 thus maintains its retracted position (shown in FIG. 1) by the biasing force of the return spring 26. Therefore, a pressure differential is not produced between the front and rear compartments 13 and 14.

When the brake pedal is depressed for operation of the brake, the push rod 20 is moved toward the left in the hub portion 15 so as to move the valve plunger 21 in the same direction (i.e., to the left of FIG. 1). Then the poppet valve 22 is moved to the left by the spring 23 so that the poppet valve may be seated on the seat 15a provided on the hub portion 15, thereby interrupting fluid communication between the front and rear compartments 13 and 14. Further, the seat 21a of the rear end portion of the valve plunger 21 is separated from the front end surface of the poppet valve 22 so as to allow atmospheric pressure into the rear compartment 14 by means of holes 27a of the boot member 27, filters 33 and 29, the clearance between the front end surface of the poppet valve 22 and the seat 21a of the rear end portion of the valve plunger 21, and passages 37 and 36 provided in the hub portion 15. Due to the pressure differential between the front and rear compartments 13 and 14, a propulsive force in a forward direction is produced in the power piston 12.

An output member 28 made of a metallic material which receives the propulsive force produced in the power piston 12 and transmits it to the outside is inserted in the large diameter opening portion 15b of the hub portion 15 at a cylindrical rear end portion 28a thereof. In the rear end portion 28a of the output member 28, a reaction disc 30 made of a rubber material is completely received. The rear end of rear end portion 28a of the output member 28 is inserted in a groove 39 provided at an outer circumferential portion of a base surface of the large diameter opening portion 15b. The double cylindrical inner circumferential portion 31a of a metallic member 31 is inserted in the large diameter portion 15b and the groove 39 of the hub portion 15 so that the outer cylinder portion 31c of the metallic member 31 may be positioned in the outer circumferential side of the rear end portion 28a of the output member 28 and so that the inner cylinder portion 31d of the metallic member 31 may be positioned in the inner circumferential side of the rear end portion 28a of the output member 28. The flange portion 31e of front end of the inner cylinder portion 31d is embedded within the reaction disc 30. The outer circumferential portion 31b of the metallic member 31 is interposed between the rear end of return spring 26 and a spring receiving face 40 of the hub portion 15.

In a state where the force of the return spring 26 is transmitted to the receiving face 40 of the hub portion 15 through the outer circumference 31b of the metallic member 31, a portion 30a of the reaction disc 30 which is positioned between the flange portion 31e of the metallic member 31 and the convex portion 41 of the hub portion 15 is maintained in a compressed state. Namely, the outer circumference seal portion of the reaction disc 30 is pressed on the front surface of the convex portion 41 of the hub portion through the metallic member 31 by the force of the return spring 26. Consequently, when the brake booster 10 is not also operated, the necessary sealing force is ensured between the rear end surface of the reaction disc 30 and the inner face of the hub portion 15. Thus the flange portion 31e and the reaction disc 30 may be formed separately or integrally as a unit.

The metallic member 31 constitutes a part of the power piston 12, and the ring-shaped elastic member 32 made of a rubber material is interposed between the rear end surface of the rear end portion 28a of the output member 28 and the inner circumferential portion 31a of the metallic member 31. This elastic member 32 defines the position of the output member 28 for the power piston 12 so that a predetermined gap δ1 may be formed between the front surface of the reaction disc 30 and the output member 28 when the vacuum brake booster 10 is not operated as shown in FIG. 1. When the vacuum brake booster 10 is not operated, another gap δ2 is further formed between the rear surface of the reaction disc 30 and the valve plunger 21. The gap δ2 is set to be of a relatively large size so that such gap will exist at least partially even though the control valve mechanism 19 is maintained in a state where the front end surface of the poppet valve 22 is contacted with the seat 15a of the hub portion 15 and is separated from the seat 21a of the valve plunger 21 by only a small distance. There is provided an increase in pressure of the rear compartment 14 because the atomspheric pressure flows into the rear compartment 14 according to operation of the control valve mechanism 19, whereby the propulsive force of the power piston 12 is at first transmitted to the output member 28 through the elastic member 32. Next, when the gap δ1 decreases and disappears due to the elastic transformation of the elastic member 32, the propulsive force of the power piston 12 is transmitted to the output member 28 via the elastic member 32 and the reaction disc 30, with the result that the reaction disc 30 is contacted with the valve plunger 21 because of the elastic transformation of the reaction disc 30 into the small diameter opening portion 15c of the hub portion 15. Consequently the reaction force adds to the valve plunger 21.

Figure 2:
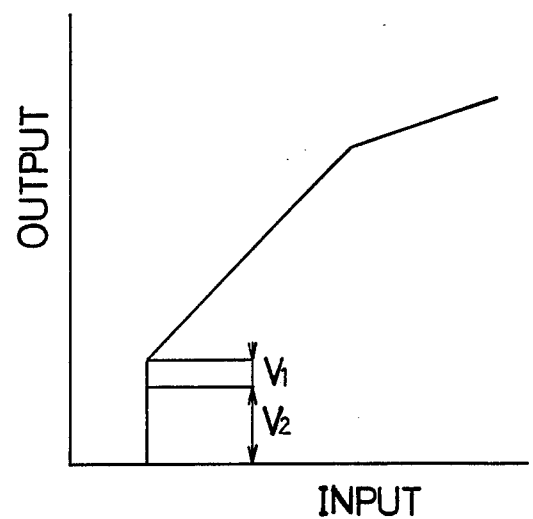
FIG. 2 shows the relationship between the input and output of the first embodiment.

FIG. 2 shows a relationship between the propulsive force (output) of output member 28 and the input added to the push rod 20 in a diagram, wherein the value $V_1$ of the propulsive force depends on the gap δ1 and the value $V_2$ of the propulsive force depends on the gap δ2.

In FIG. 1, the inner diameter of the flange portion 31e of the metallic member 31 is larger than the diameter of the small diameter opening portion 15c. However, even though the inner diameter of the flange portion 31e of the metallic member 31 is larger than the diameter of the small diameter opening portion 15c, the boost ratio of the brake booster becomes equal to the boost ratio of the brake booster in which the diameter of the small diameter opening portion 15c is reduced to the inner diameter of the flange portion 31e. Consequently, the boost ratio is changed by means of exchanging the metallic member 31, namely exchanging the inner diameter of the flange portion 31e even if the hub portion 15 is the same.

Figure 3:
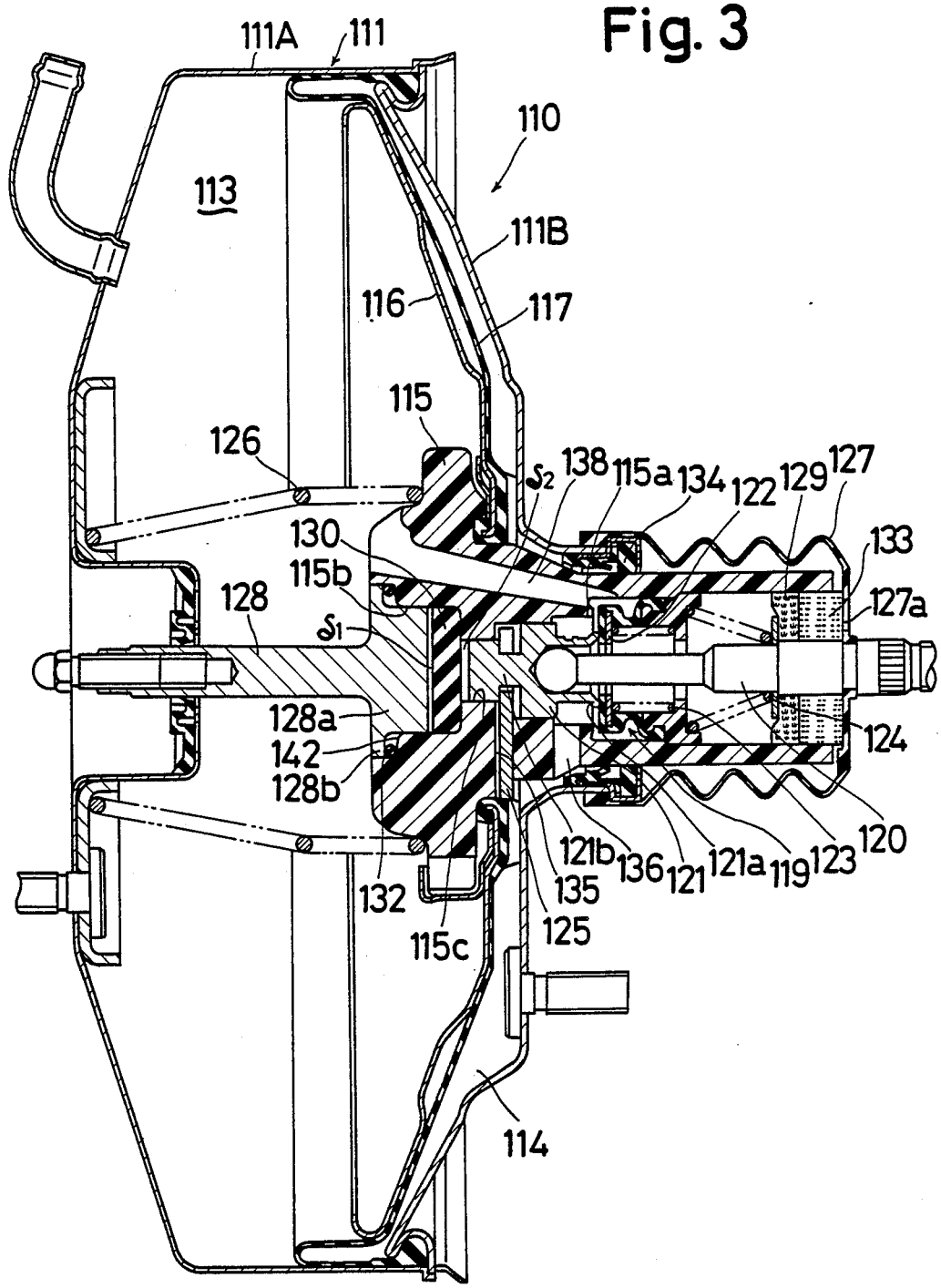
FIG. 3 shows a second embodiment of the present invention in a cross-sectional view.

FIG. 3 shows another embodiment of the present invention. Those parts which correspond to the constituents of the first embodiment shown in FIG. 1 are indicated by the same numbers in FIG. 1 but are in one hundred series. In this embodiment, elastic member 132 is interposed between the flange portion 128b provided on the outer circumference of rear end portion 128a of output member 128 and the inner stepped portion 142 of the hub portion 115 of the power piston 112. In addition, the rearmost position of the power piston 112 is prevented by means of contacting the inner bead of the diaphragm 117 with the inner surface of the housing 111.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vacuum booster, comprising:
   a push rod movable in an axial direction in resonse to movement of a brake pedal;
   a housing having a first and second compartment formed therein;
   power piston means located in said housing and operated in response to a pressure differential between said first and second compartments wherein said power piston means further comprises a large diameter opening portion and a small diameter opening portion;
   control valve means operatively connected with a front end portion of said push rod and located within said power piston means for controlling said pressure differential between said first and second compartments in response to movement of said push rod;
   output means having a rear end portion slidably disposed within said large diameter opening portion of said power piston means;
   said control valve means further comprising a valve plunger, one end of which is slidably disposed within said small diameter opening portion of said power piston;
   a resilient reaction disc located adjacent said rear end portion of said output means and disposed within said large diameter opening portion of said power piston; and
   an elastic member disposed axially between said rear end portion of said output means and said power piston so as to increase a propulsive force of said output means under the condition where the reaction force is not added to said valve plunger from said output means via said resilient reaction disc without causing an excessive elastic transformation of said resilient reaction disc,
   said elastic member defining a position of said output means for said power piston for forming a predetermined gap in an axial direction between a front surface of said resilient reaction disc and said output means when said vacuum booster is not operated.

2. A vacuum booster as set forth in claim 1, wherein said elastic member is disposed between a flange portion provided on an outer circumference of said rear end portion of said output member and an inner stepped portion of said hub portion of said power piston.

3. A vacuum booster as set forth in claim 1, wherein said output means further comprises a cylindrical rear end portion inserted in a groove provided at an outer circumferential portion of a base surface of said large diameter opening portion, and wherein said elastic member is disposed within an opposed portion in said axial direction between said cylindrical rear end portion of said output means and said groove.

4. A vacuum booster as set forth in claim 1, wherein said elastic member is ring-shaped and comprises rubber material.

5. A vacuum booster, comprising:
   a push rod movable in an axial direction in response to movement of a brake pedal;
   a housing having a first and second compartment formed therein;
   power piston means located in said housing and operated in response to a pressure differential between said first and second compartments wherein said power piston means further comprises a large diameter opening portion and a small diameter opening portion;
   control valve means operatively connected with a front end portion of said push rod and located within said power piston means for controlling said pressure differential between said first and second compartments in response to movement of said push rod;

output means having a rear end portion slidably disposed within said large diameter opening portion of said power piston means;

said control valve means further comprising a valve plunger, one end of which is slidably disposed within said small diameter opening portion of said power piston;

a resilient reaction disc located adjacent said rear end portion of said output means and disposed within said large diameter opening portion of said power piston; and an elastic member disposed axially between said rear end portion of said output means and said power piston, said elastic member defining a position of said output means for said power piston for formng a predetermined gap in an axial direction between a front surface of said resilient reaction disc and said output means when said vacuum booster is not operated; and a metallic member and a return spring disposed in said housing wherein said elastic member is disposed between said cylindrical rear end portion of said output means and a double cylindrical inner circumferential portion inserted in said groove of an outer circumferential portion of said metallic member interposed between said return spring and a hub portion of said power piston and a flange portion of a front end of the inner cylinder portion which is embedded within said reaction disc.

* * * * *

UNITED STATES PATENT AND TRADEMARK OFFICE
CERTIFICATE OF CORRECTION

PATENT NO. : 4,757,748
DATED : July 19, 1988
INVENTOR(S) : SATOSHI KAWASUMI et al It is certified that error appears in the above-identified patent and that said Letters Patent is hereby corrected as shown below:

Column 1, line 14, change "so called" to --so-called--.

Column 5, line 32, delete "though" and insert therefor --if--;

line 33, delete "larger" and insert therefor --smaller--;

line 65, change "resonse" to --response--.

Signed and Sealed this

Third Day of August, 1993

Attest:

MICHAEL K. KIRK

*Attesting Officer*   Acting Commissioner of Patents and Trademarks